United States Patent
Candelore et al.

(10) Patent No.: US 11,825,131 B2
(45) Date of Patent: Nov. 21, 2023

(54) USING ATSC 3.0 TO AUGMENT IN-STADIUM VIDEO FEEDS

(71) Applicant: Sony Corporation, Tokyo (JP)

(72) Inventors: Brant Candelore, Poway, CA (US); Fred Ansfield, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 214 days.

(21) Appl. No.: 15/930,077

(22) Filed: May 12, 2020

(65) Prior Publication Data

US 2021/0360293 A1    Nov. 18, 2021

(51) Int. Cl.
| | |
|---|---|
| *H04N 21/214* | (2011.01) |
| *H04N 21/414* | (2011.01) |
| *H04N 21/4627* | (2011.01) |
| *H04N 21/438* | (2011.01) |
| *H04N 21/81* | (2011.01) |
| *H04N 21/482* | (2011.01) |

(52) U.S. Cl.
CPC ... *H04N 21/2143* (2013.01); *H04N 21/41407* (2013.01); *H04N 21/41415* (2013.01); *H04N 21/4383* (2013.01); *H04N 21/4627* (2013.01); *H04N 21/482* (2013.01); *H04N 21/8173* (2013.01)

(58) Field of Classification Search
CPC ......... H04N 21/2143; H04N 21/41407; H04N 21/41415
USPC .......................................................... 725/28
See application file for complete search history.

(56) References Cited

U.S. PATENT DOCUMENTS

| | | | | |
|---|---|---|---|---|
| 8,775,319 | B2* | 7/2014 | Kahn | G06Q 50/184 |
| | | | | 726/2 |
| 2008/0062318 | A1* | 3/2008 | Ellis | H04N 21/472 |
| | | | | 348/564 |
| 2008/0125896 | A1* | 5/2008 | Troy | G05D 1/0033 |
| | | | | 700/110 |
| 2010/0154023 | A1* | 6/2010 | Dey | H04N 21/4508 |
| | | | | 725/151 |
| 2010/0310068 | A1* | 12/2010 | Fischer | H04N 7/1675 |
| | | | | 380/43 |
| 2012/0079577 | A1* | 3/2012 | Hao | H04N 21/64322 |
| | | | | 726/7 |
| 2012/0108216 | A1* | 5/2012 | Wohlwend | H04W 4/02 |
| | | | | 455/414.1 |
| 2013/0339877 | A1* | 12/2013 | Skeen | G06F 16/686 |
| | | | | 707/754 |
| 2014/0049693 | A1* | 2/2014 | Selim | H04N 21/4332 |
| | | | | 348/570 |

(Continued)

OTHER PUBLICATIONS

"RFC 4033, DNS Security Introduction and Requirements," Arends, R., Austein, R., Larson, M., Massey, D., and S. Rose, Internet Engineering Task Force, Fremont, CA, Mar. 2005.

(Continued)

*Primary Examiner* — Kyu Chae

(74) *Attorney, Agent, or Firm* — John L. Rogitz; John M. Rogitz

(57) ABSTRACT

Techniques are described for using ATSC 3.0 to augment in-stadium (including in-arena) video feeds. In addition to a central stadium large screen view, spectators can use their mobile devices or view wall-mounted TVs around the stadium to receive in-stadium special feeds broadcast using ATSC 3.0, but not necessarily broadcast beyond the stadium and its environs.

19 Claims, 8 Drawing Sheets

(56) References Cited

U.S. PATENT DOCUMENTS

| | | | | |
|---|---|---|---|---|
| 2014/0186004 | A1* | 7/2014 | Hamer | G11B 27/322 386/223 |
| 2014/0196093 | A1* | 7/2014 | Kotecha | H04N 21/25841 725/54 |
| 2014/0215532 | A1* | 7/2014 | Schmidt | H04N 21/2668 725/74 |
| 2014/0258859 | A1* | 9/2014 | Plumb | H04R 27/00 715/716 |

OTHER PUBLICATIONS

"RFC 4055, Additional Algorithms and Identifiers for RSA Cryptography for use in the Internet X.509 Public Key Infrastructure Certificate and Certificate Revocation List (CRL) Profile," J. Schaad, B. Kaliski, R. Housley, Internet Engineering Task Force, Fremont, CA, Jun. 2005.
"ATSC Standard: ATSC 3.0 Interactive Content (A/344)", May 2, 2019.
"ATSC Standard: ATSC 3.0 Security and Service Protection", Aug. 20, 2019.
"ATSC Standard: ATSC 3.0 System", Sep. 17, 2019.
"ATSC Standard: Signaling, Delivery, Synchronization, and Error Protection (A/331)", Jun. 19, 2019.
"RFC 3279, Algorithms and Identifiers for the Internet X.509 Public Key Infrastructure Certificate and Certificate Revocation List (CRL) Profile," L. Bassham, W. Polk, R. Housley, Internet Engineering Task Force, Fremont, CA, Apr. 2002.
"RFC 5280, Internet X.509 Public Key Infrastructure Certificate and Certificate Revocation List (CRL) Profile," D. Cooper, S. Santesson, S. Farrell, S. Boeyen, R. Housley, W. Polk, Internet Engineering Task Force, Fremont, CA, May 2008.
"RFC 5289, TLS Elliptic Curve Cipher Suites with SHA-256/384 and AES Galois Counter Mode (GCM)," E. Rescorla, Internet Engineering Task Force, Fremont, CA, Aug. 2008.
"RFC 5480, Elliptic Curve Cryptography Subject Public Key Information," S. Turner, D. Brown, K. Yiu, R. Housley, T. Polk, Internet Engineering Task Force, Fremont, CA, Mar. 2009.
"RFC 5652, Cryptographic Message Syntax (CMS)," R. Housley, Internet Engineering Task Force, Fremont, CA, Sep. 2009.
"RFC 5751, Secure/Multipurpose Internet Mail Extensions (S/MIME) Version 3.Message Specification," B. Ramsdell, S. Turner, Internet Engineering Task Force, Fremont, CA, Jan. 2010.
"RFC 5753, Use of Elliptic Curve Cryptography (ECC) Algorithms in Cryptographic Message Syntax (CMS)," S. Turner, D. Brown, Internet Engineering Task Force, Fremont, CA, Jan. 2010.
"RFC 5758, Internet X.509 Public Key Infrastructure: Additional Algorithms and Identifiers for DSA and ECDSA," Q. Dang, S. Santesson, K. Moriarty, D. Brown, T. Polk, Internet Engineering Task Force, Fremont, CA, Jan. 2010.
"RFC 5940, Additional Cryptographic Message Syntax (CMS) Revocation Information Choices," S. Turner, R. Housley, Internet Engineering Task Force, Fremont, CA, Aug. 2010.
"RFC 6960, X.509 Internet Public Key Infrastructure Online Certificate Status Protocol—OCSP," S. Santesson, M. Myers, R. Ankney, A. Malpani, S. Galperin, C. Adams, Internet Engineering Task Force, Fremont, CA, Jun. 2013.
"RFC 5019, The Lightweight Online Certificate Status Protocol (OCSP) Profile for High-Volume Environments," A. Deacon, R. Hurst, Internet Engineering Task Force, Fremont, CA, Sep. 2007.

* cited by examiner

USING ATSC 3.0 TO AUGMENT IN-STADIUM VIDEO FEEDS

FIELD

This application relates to technical advances necessarily rooted in computer technology and directed to digital television, and more particularly to Advanced Television Systems Committee (ATSC) 3.0.

BACKGROUND

The Advanced Television Systems Committee (ATSC) 3.0 suite of standards is a set of over a dozen industry technical standards as indicated in ATSC A/300 for delivering the next generation of broadcast television. ATSC 3.0 supports delivery of a wide range of television services including televised video, interactive services, non-real time delivery of data, and tailored advertising to a large number of receiving devices, from ultra-high definition televisions to wireless telephones. ATSC 3.0 also orchestrates coordination between broadcast content (referred to as "over the air") and related broadband delivered content and services (referred to as "over the top"). ATSC 3.0 is designed to be flexible so that as technology evolves, advances can be readily incorporated without requiring a complete overhaul of any related technical standard. Present principles are directed to such advances as divulged below.

SUMMARY

As understood herein, modern stadiums (which includes arenas) ubiquitously provide video of the on-field action to spectators using very large screen displays such as "Jumbotrons®" that almost everyone in the stadium can view to see live and replay action.

As also understood herein, as digital TV and more specifically ATSC 3.0 becomes ubiquitous in TVs and portable devices, additional opportunity is afforded to broadcast special in-stadium video feeds to mobile devices and TVs mounted in various locations of the stadium. One ATSC 3.0 broadcast transmitter can provide content to thousands of receivers in a stadium, providing alternative, immersive video to thousands of spectators watching a spectacle that one-to-one wireless protocols such as 5G cannot provide.

Accordingly, a system includes at least one advanced television systems committee (ATSC) 3.0 transmitter disposed in a stadium or a parking lot thereof. The system includes at least one server associated with the stadium, for example related to an event sponsor, e.g. CBS sports, National Football League (NFL) sports, National Basketball Association (NBA) sports or a Live Nation concert, and at least one user device in the stadium and configured with instructions to download from the server at least one application ("app"). The instructions are executable to execute the app to select at least a first video broadcast from the ATSC 3.0 transmitter showing at least a portion of the stadium. The video broadcast is not broadcast by the ATSC 3.0 transmitter to receivers outside the stadium and parking areas thereof.

In some embodiments, video of action in the stadium is broadcast using ATSC 3.0 to a market region and the first video broadcast is not broadcast to the market region beyond the stadium and parking areas thereof.

In example implementations, the app can be executable by the user device to provide signals from the ATSC 3.0 transmitter to a secure section of system on a chip (SoC) in the user device. This can bypass the main processor that is typically also found in that SoC but logically separated from the secure section. The secure section may be configured with a cryptographic processor to execute instructions to implement digital rights management (DRM) of the first video broadcast. The DRM may preclude re-transmission of the first video from the user device. In addition, the receiver can be instructed to decode the first video only if it has been received by tuner or demodulator of the receiver.

In non-limiting embodiments, the app is executable by the user device to present on the user device at least one user interface (UI). The UI may include at least a list of plural video feeds pertaining to activity in the stadium. The first video broadcast is on the list for selection thereof. The app further may be configured to correlate the video feeds to frequencies such that the user device is caused to tune to a frequency responsive to selection of a corresponding video feed from the list.

In some examples, the app can be configured to recognize which frequencies and associated video feeds are associated with the stadium, such that the user device executing the app is presented with a first list in a first stadium and a second list in a second stadium.

In examples, the user device may be configured with instructions to download along with the app encryption information necessary to present the first video feed on the user device.

The user device may be implemented by a hand-holdable user device. Or, the user device may be implemented by a TV mounted in the stadium. The hand-holdable user device when executing the app may be configured to present a first list of video feeds and the TV when executing the app may be configured to present a second list of video feeds different from the first list.

In another aspect, a digital television transmitter includes at least one processor programmed with instructions to receive an audio-video stream of sport or music content local to the stadium or concert hall. The instructions are executable to modulate the stream and send the content to an exciter for transmission thereof.

In another aspect, a media playback apparatus includes at least one demodulator and at least one processor programmed with instructions to configure a tuner to receive a broadcast digital TV signal in a stadium or concert hall venue. The instructions are executable to use the demodulator to process the broadcast digital TV signals to recover an audio-video stream that contains sport or music content, and to present the audio-video stream.

The details of the present application, both as to its structure and operation, can best be understood in reference to the accompanying drawings, in which like reference numerals refer to like parts, and in which:

DETAILED DESCRIPTION

Figure 1:
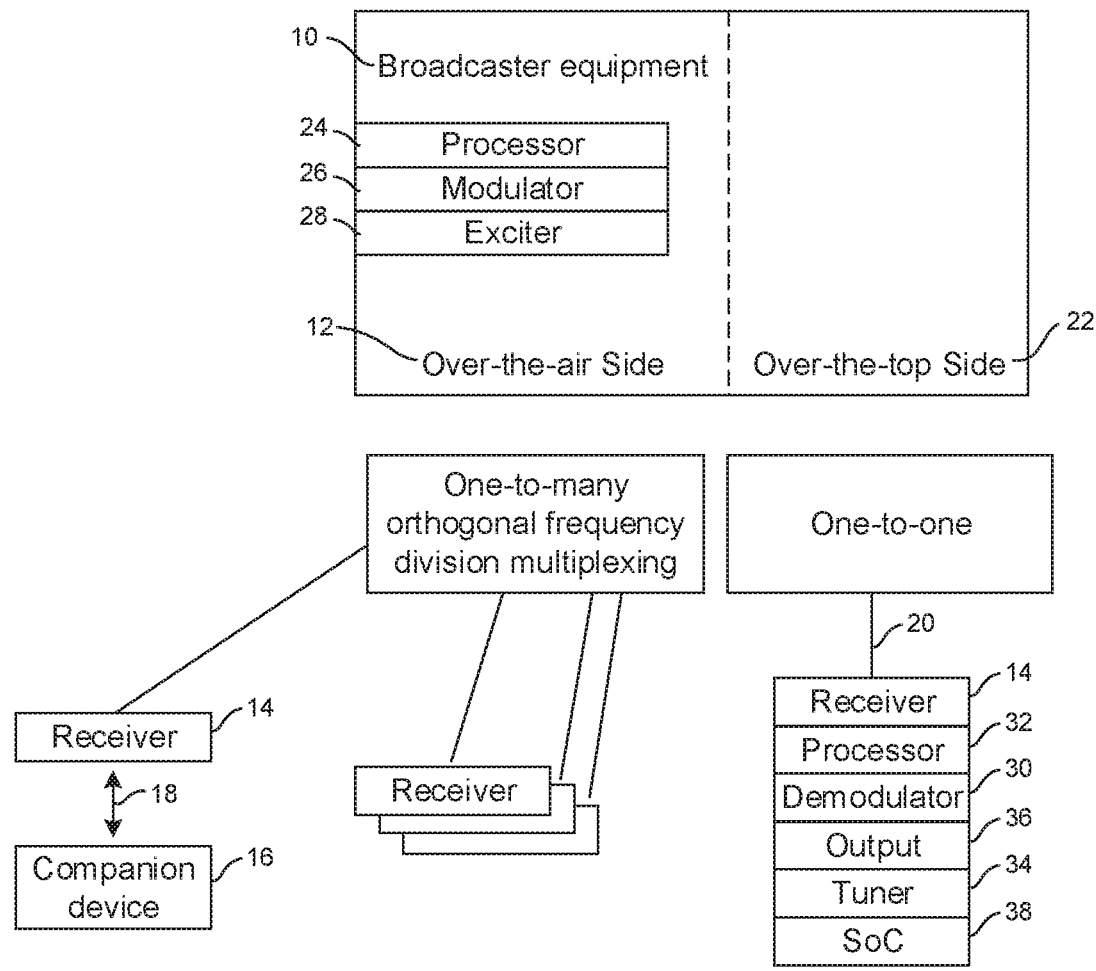
FIG. 1 is a block diagram of an Advanced Television Systems Committee (ATSC) 3.0 system.

This disclosure relates to technical advances in digital television such as in Advanced Television Systems Committee (ATSC) 3.0 television. An example system herein may include ATSC 3.0 source components and client components, connected via broadcast and/or over a network such that data may be exchanged between the client and ATSC 3.0 source components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google, such as Android®. These operating environments may be used to execute one or more browsing programs, such as a browser made by Microsoft or Google or Mozilla or other browser program that can access websites hosted by the Internet servers discussed below.

ATSC 3.0 source components may include broadcast transmission components and servers and/or gateways that may include one or more processors executing instructions that configure the source components to broadcast data and/or to transmit data over a network such as the Internet. A client component and/or a local ATSC 3.0 source component may be instantiated by a game console such as a Sony PlayStation®, a personal computer, etc.

Information may be exchanged over a network between the clients and servers. To this end and for security, servers and/or clients can use HTTP-secure (HTTPS) and the use of public key certificates in the servers and clients for authentication, include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to hypertext markup language (HTML)-5, Java®/Javascript, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Turning to FIG. 1, an example of an ATSC 3.0 source component is labeled "broadcaster equipment" 10 and may include over-the-air (OTA) equipment 12 for wirelessly broadcasting, typically via orthogonal frequency division multiplexing (OFDM) in a one-to-many relationship, television data to plural receivers 14 such as ATSC 3.0 televisions. One or more receivers 14 may communicate with one or more companion devices 16 such as remote controls, tablet computers, smart watch, mobile telephones, and the like over a short range, typically wireless link 18 that may be implemented by Bluetooth®, low energy Bluetooth, other near field communication (NFC) protocol, infrared (IR), etc.

Also, one or more of the receivers 14 may communicate, via a wired and/or wireless network link 20 such as the Internet, with over-the-top (OTT) equipment 22 of the broadcaster equipment 10 typically in a one-to-one relationship. The OTA equipment 12 may be co-located with the OTT equipment 22 or the two sides 12, 22 of the broadcaster equipment 10 may be remote from each other and may communicate with each other through appropriate means. In any case, a receiver 14 may receive ATSC 3.0 television signals OTA over a tuned-to ATSC 3.0 television channel and may also receive related content, including television, OTT (broadband). And it is possible to deliver an ATSC 3.0 television signals OTA without any corresponding OTT content which would require a one-to-one relationship that might be difficult to achieve in a stadium or concert hall venue. Note that computerized devices described in all of the figures herein may include some or all of the components set forth for various devices in FIGS. 1 and 2.

In the example of FIG. 1, the OTA side 12 includes a transmitter as discussed and at least one processor 24 programmed with instructions to receive an audio-video stream of sport or music content local to a stadium or concert hall and to modulate the stream using at least one modulator 26, which sends the modulated stream to at least one exciter 28 for transmission thereof.

In the example of FIG. 1, any of the receivers 14 may implement a media playback apparatus that includes at least one demodulator 30 and at least one processor 32 programmed with instructions to configure a tuner 34 to receive a broadcast digital TV signal in a stadium or concert hall venue. The instructions are executable to use the demodulator 30 to process the broadcast digital TV signals to recover an audio-video stream that contains sport or music content, and to present the audio-video stream on an output device 36 such as a video display and/or audio speaker. A secure chip 38 such as a system on a chip (SoC) may also be included and may be logically separate from the main processor 32 of the receiver that may also be in the SoC.

Figure 2:
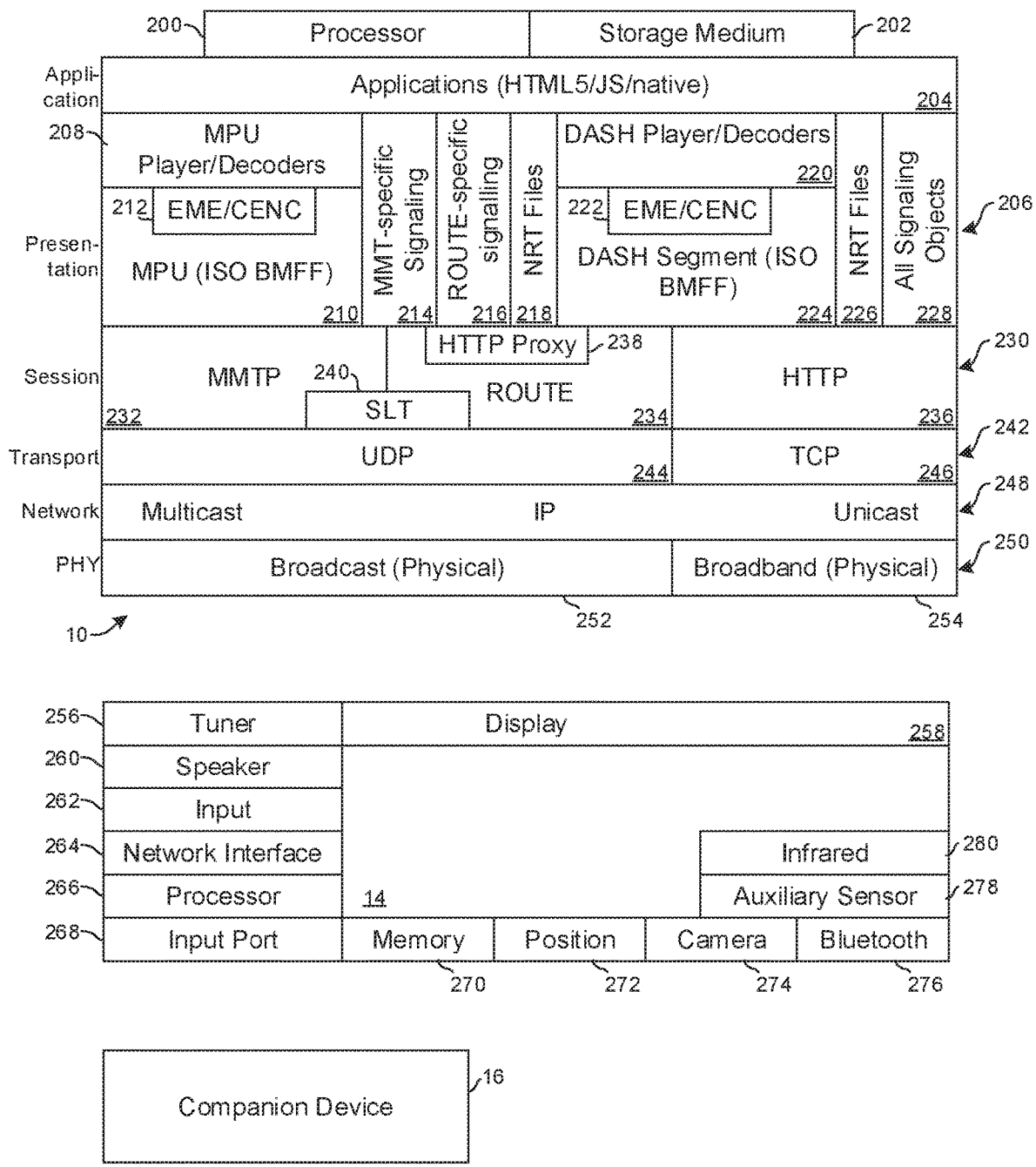
FIG. 2 is a block diagram showing components of the devices shown in FIG. 1.

Referring now to FIG. 2, details of examples of components shown in FIG. 1 may be seen. FIG. 2 illustrates an example protocol stack that may be implemented by a combination of hardware and software. Using the ATSC 3.0 protocol stack shown in FIG. 2 and modified as appropriate for the broadcaster side, broadcasters can send hybrid service delivery in which one or more program elements are delivered via a computer network (referred to herein as "broadband" and "over-the-top" (OTT)) as well as via a wireless broadcast (referred to herein as "broadcast" and "over-the-air" (OTA)). FIG. 2 also illustrates an example stack with hardware that may be embodied by a receiver.

Disclosing FIG. 2 in terms of broadcaster equipment 10, one or more processors 200 accessing one or more computer storage media 202 such as any memories or storages described herein may be implemented to provide one or more software applications in a top-level application layer 204. The application layer 204 can include one or more software applications written in, e.g., HTML5/Javascript running in a runtime environment. Without limitation, the applications in the application stack 204 may include linear TV applications, interactive service applications, companion screen applications, personalization applications, emergency alert applications, and usage reporting applications. The applications typically are embodied in software that represents the elements that the viewer experiences, including video coding, audio coding and the run-time environment. As an example, an application may be provided that enables a user to control dialog, use alternate audio tracks, control audio parameters such as normalization and dynamic range, and so on.

Below the application layer 204 is a presentation layer 206. The presentation layer 206 includes, on the broadcast (OTA) side, broadcast audio-video playback devices referred to as Media Processing Units (MPU) 208 that, when implemented in a receiver, decode and playback, on one or more displays and speakers, wirelessly broadcast audio video content. The MPU 208 is configured to present International Organization for Standardization (ISO) base media file format (BMFF) data representations 210 and video in high efficiency video coding (HEVC) with audio in, e.g., Dolby audio compression (AC)-4 format. ISO BMFF is a general file structure for time-based media files broken into "segments" and presentation metadata. Each of the files is essentially a collection of nested objects each with a type and a length. To facilitate decryption, the MPU 208 may access a broadcast side encrypted media extension (EME)/ common encryption (CENC) module 212.

FIG. 2 further illustrates that on the broadcast side the presentation layer 206 may include signaling modules, including either motion pictures expert group (MPEG) media transport protocol (MMTP) signaling module 214 or real-time object delivery over unidirectional transport (ROUTE) signaling module 216 for delivering non-real time (NRT) content 218 that is accessible to the application layer 204. NRT content may include but is not limited to stored replacement advertisements.

On the broadband (OTT or computer network) side, when implemented by a receiver the presentation layer 206 can include one or more dynamic adaptive streaming over hypertext transfer protocol (HTTP) (DASH) player/decoders 220 for decoding and playing audio-video content from the Internet. To this end the DASH player 220 may access a broadband side EME/CENC module 222. The DASH content may be provided as DASH segments 224 in ISO/ BMFF format.

As was the case for the broadcast side, the broadband side of the presentation layer 206 may include NRT content in files 226 and may also include signaling objects 228 for providing play back signaling.

Below the presentation layer 206 in the protocol stack is a session layer 230. The session layer 230 includes, on the broadcast side, either MMTP protocol 232 or ROUTE protocol 234.

On the broadband side the session layer 230 includes HTTP protocol 236 which may be implemented as HTTP-secure (HTTPS). The broadcast side of the session layer 230 also may employ a HTTP proxy module 238 and a service list table (SLT) 240. The SLT 240 includes a table of signaling information which is used to build a basic service listing and provide bootstrap discovery of the broadcast content. Media presentation descriptions (MPD) are included in the "ROUTE Signaling" tables delivered over user datagram protocol (UDP) by the ROUTE transport protocol.

A transport layer 242 is below the session layer 230 in the protocol stack for establishing low-latency and loss-tolerating connections. On the broadcast side the transport layer 242 uses user datagram protocol (UDP) 244 and on the broadband side transmission control protocol (TCP) 246.

The example non-limiting protocol stack shown in FIG. 2 also includes a network layer 248 below the transport layer 242. The network layer 248 uses Internet protocol (IP) on both sides for IP packet communication, with multicast delivery being typical on the broadcast side and unicast being typical on the broadband side.

Below the network layer 248 is the physical layer 250 which includes broadcast transmission/receive equipment 252 and computer network interface(s) 254 for communicating on the respective physical media associated with the two sides. The physical layer 250 converts Internet Protocol (IP) packets to be suitable to be transported over the relevant medium and may add forward error correction functionality to enable error correction at the receiver as well as contain modulation and demodulation modules to incorporate modulation and demodulation functionalities. This converts bits into symbols for long distance transmission as well as to increase bandwidth efficiency. On the OTA side the physical layer 250 typically includes a wireless broadcast transmitter to broadcast data wirelessly using orthogonal frequency division multiplexing (OFDM) while on the OTT side the physical layer 250 includes computer transmission components to send data over the Internet.

A DASH Industry Forum (DASH-IF) profile formatted data sent through the various protocols (HTTP/TCP/IP) in the protocol stack may be used on the broadband side. Media files in the DASH-IF profile formatted data based on the ISO BMFF may be used as the delivery, media encapsulation and synchronization format for both broadcast and broadband delivery.

Each receiver 14 typically includes a protocol stack that is complementary to that of the broadcaster equipment.

A receiver 14 in FIG. 1 may include, as shown in FIG. 2, an Internet-enabled TV with an ATSC 3.0 TV tuner (equivalently, set top box controlling a TV) 256. The receiver 14 may be an Android®-based system. The receiver 14 alternatively may be implemented by a computerized Internet enabled ("smart") telephone, a tablet computer, a notebook computer, a wearable computerized device, and so on. Regardless, it is to be understood that the receiver 14 and/or other computers described herein is configured to undertake present principles (e.g. communicate with other devices to undertake present principles, execute the logic described herein, and perform any other functions and/or operations described herein).

Accordingly, to undertake such principles the receiver 14 can be established by some or all of the components shown in FIG. 1. For example, the receiver 14 can include one or more displays 258 that may be implemented by a high definition or ultra-high definition "4K" or higher flat screen and that may or may not be touch-enabled for receiving user input signals via touches on the display. The receiver 14 may also include one or more speakers 260 for outputting audio in accordance with present principles, and at least one additional input device 262 such as, e.g., an audio receiver/microphone for, e.g., entering audible commands to the receiver 14 to control the receiver 14. The example receiver 14 may further include one or more network interfaces 264 for communication over at least one network such as the Internet, a WAN, a LAN, a PAN etc. under control of one or more processors 266. Thus, the interface 264 may be, without limitation, a Wi-Fi transceiver, which is an example of a wireless computer network interface, such as but not limited to a mesh network transceiver. The interface 264 may be, without limitation, a Bluetooth® transceiver, Zigbee® transceiver, Infrared Data Association (IrDA) transceiver, Wireless USB transceiver, wired USB, wired LAN, Powerline or Multimedia over Coax Alliance (MoCA). It is to be understood that the processor 266 controls the receiver 14 to undertake present principles, including the other elements of the receiver 14 described herein such as, for instance, controlling the display 258 to present images thereon and receiving input therefrom. Furthermore, note the network interface 264 may be, e.g., a wired or wireless modem or router, or other appropriate interface such as, e.g., a wireless telephony transceiver, or Wi-Fi transceiver as mentioned above, etc.

In addition to the foregoing, the receiver 14 may also include one or more input ports 268 such as a high definition multimedia interface (HDMI) port or a USB port to physically connect (using a wired connection) to another CE device and/or a headphone port to connect headphones to the receiver 14 for presentation of audio from the receiver 14 to a user through the headphones. For example, the input port 268 may be connected via wire or wirelessly to a cable or satellite source of audio video content. Thus, the source may be a separate or integrated set top box, or a satellite receiver. Or, the source may be a game console or disk player.

The receiver 14 may further include one or more computer memories 270 such as disk-based or solid-state storage that are not transitory signals, in some cases embodied in the chassis of the receiver as standalone devices or as a personal video recording device (PVR) or video disk player either internal or external to the chassis of the receiver for playing back audio video (AV) programs or as removable memory media. Also, in some embodiments, the receiver 14 can include a position or location receiver 272 such as but not limited to a cellphone receiver, global positioning satellite (GPS) receiver, and/or altimeter that is configured to e.g. receive geographic position information from at least one satellite or cellphone tower and provide the information to the processor 266 and/or determine an altitude at which the receiver 14 is disposed in conjunction with the processor 266. However, it is to be understood that that another suitable position receiver other than a cellphone receiver, GPS receiver and/or altimeter may be used in accordance with present principles to determine the location of the receiver 14 in e.g. all three dimensions.

Continuing the description of the receiver 14, in some embodiments the receiver 14 may include one or more cameras 274 that may include one or more of a thermal imaging camera, a digital camera such as a webcam, and/or a camera integrated into the receiver 14 and controllable by the processor 266 to gather pictures/images and/or video in accordance with present principles. Also included on the receiver 14 may be a Bluetooth® transceiver 276 or other Near Field Communication (NFC) element for communication with other devices using Bluetooth® and/or NFC technology, respectively. An example NFC element can be a radio frequency identification (RFID) element.

Further still, the receiver 14 may include one or more auxiliary sensors 278 (such as a motion sensor such as an accelerometer, gyroscope, cyclometer, or a magnetic sensor and combinations thereof), an infrared (IR) sensor for receiving IR commands from a remote control, an optical sensor, a speed and/or cadence sensor, a gesture sensor (for sensing gesture commands) and so on providing input to the processor 266. An IR sensor 280 may be provided to receive commands from a wireless remote control. A battery (not shown) may be provided for powering the receiver 14.

The companion device 16 may incorporate some or all of the elements shown in relation to the receiver 14 described above.

The methods described herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the Internet.

Figure 3:
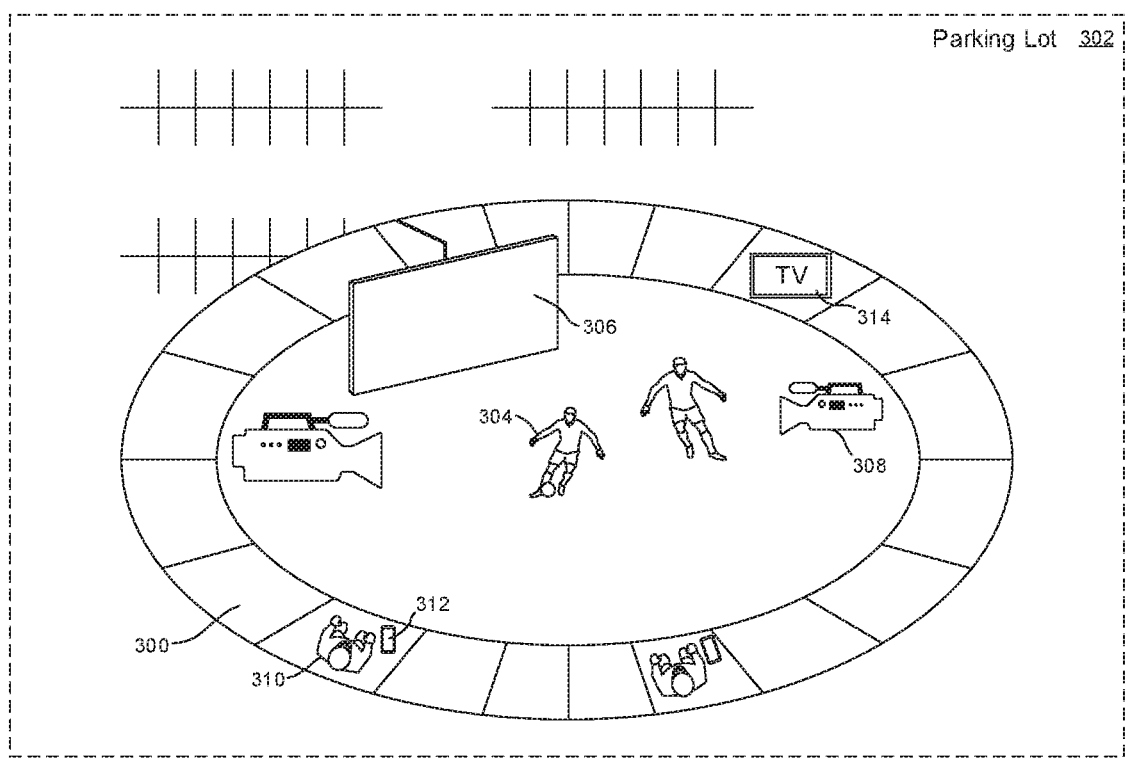
FIG. 3 illustrates a stadium with various cameras and displays.

Now referring to FIG. 3, a stadium 300 or concert hall venue or other type of public arena is shown typically surrounded by a parking lot 302 and providing a field of play in which contestants 304 compete or perform. For disclosure purposes the term "stadium" is used below without loss of generality.

A stadium very large screen display 306 may be suspended from the stadium roof or other structure to present video of on-field action and also to present replays of important plays as filmed by typically plural cameras 308 deployed throughout the stadium. Spectators 310 can view the action on the field and the video presented on the display 306. As described herein, video from the stadium cameras 308 other than that shown in the very large screen display 306 may be presented on mobile devices 312 of the spectators and on TVs 314 mounted in various locations within the stadium to provide further viewing options for the spectators 310 by a one-to-many distribution of live content in the stadium 300 presenting alternative views, close-ups and even replays to many thousands of spectators.

Figure 4:
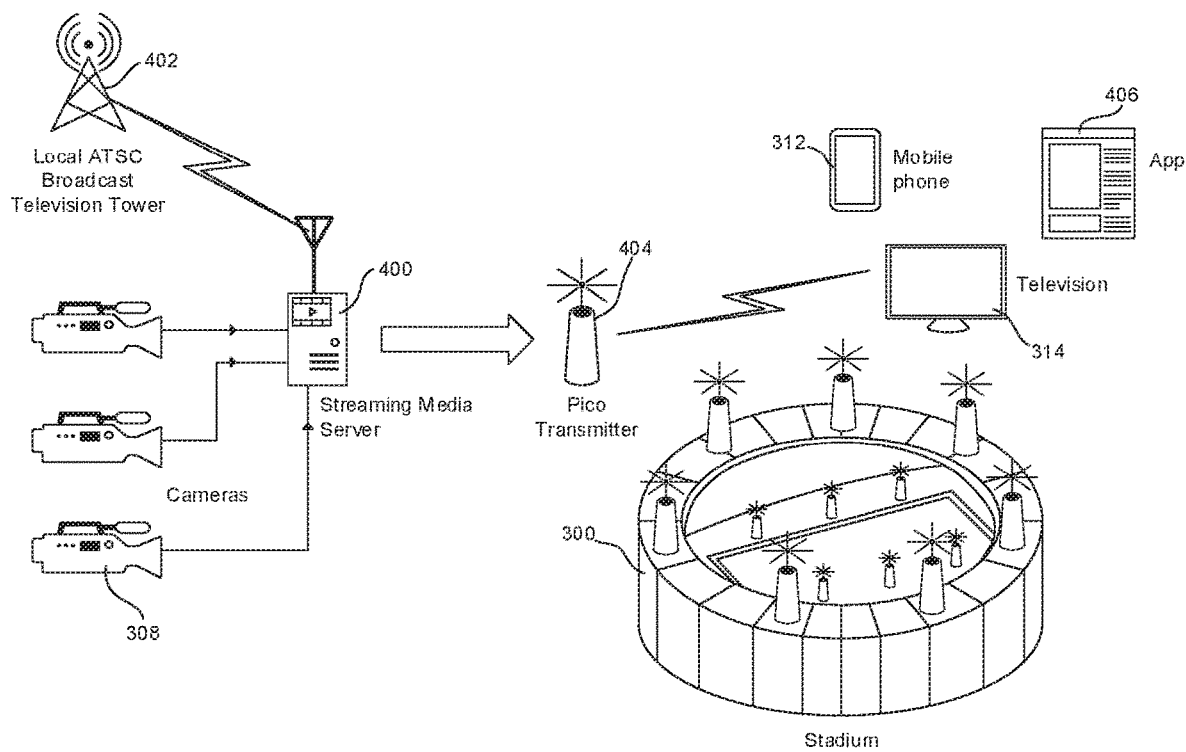
FIG. 4 illustrates the stadium with various video transmission equipment.

FIG. 4 illustrates further. The stadium cameras 308 may send their feeds to one or more streaming media servers 400, which also may receive digital TV signals broadcast from an ATSC 3.0 transmitter 402. Signals from the ATSC 3.0 transmitter 402 may be received in the stadium 300 and its parking lot environs as well as in the geographic market region surrounding the stadium.

On the other hand, feeds from the video cameras 308 may be provided via the server 400 to one or more low-power digital TV localized transmitters 404 such as so-called "pico or "fempto" transmitters that may use ATSC 3.0 protocol at very low power, such that video signals from the localized transmitter 404 can be presented on devices within the stadium (and if desired its environs such as the parking lot) including the mobile devices 312 and TVs 314 shown in FIG. 3, each of which may execute an app 406 for this purpose. The app 406 can be programmed with or can discover the appropriate transmission frequencies of the localized transmitter 404, or the app may know what frequencies are available even without the need to scan by detecting, using a global position satellite (GPS) receiver or other location sensor, the location of the stadium or similar venue. As the app knows the location of the stadium, it knows the frequencies used by the high power over-the-air ATSC broadcasts used by the networks at that location and can avoid using or interfering with those frequencies. The mobile devices 312 and TV 314 are examples of media playback apparatus.

The localized transmitter 404 can provide a single stream in a single multiplex, multiple streams in a single multiplex, or multiple streams in multiple multiplexes at respective multiple frequencies.

As with any broadcast signal, it is possible for a hacker to user a portable transmitter to overdrive the in-stadium over-the-air signal. The ATSC 3.0 signal is especially vulnerable because the signaling could send receivers in the stadium to rogue websites. The rogue websites might allow the receivers to get hacked, and also to receive unwanted content. As described further below, in order to prevent this from happening, it may be achieved in part by requiring the special video to be encrypted and any signaling appropriately signed, with the app 406 ignoring unsigned or improperly signed signaling. The app may also include public key certificates that can be downloaded with the app. The certificates contain public keys which can be used to authenticate the signaling of the in-stadium transmission. Not only is the signaling protected, but also the video transmissions. The in-stadium video may be unconditionally encrypted. When registering the stadium application, the portable devices 312 or TV 314 may receive receiver certificates based on the manufacturer, model number and serial number and also if desired a Digital Rights Management (DRM) system. These certificates may be used to deliver an encryption key to descramble the content.

Note that the mounted TVs 314 may be allowed to receive other channels that the mobile devices 312 cannot access. The stadium management may not want these TVs to be arbitrarily tuned to different in-stadium feeds. These TVs are usually in common areas and around concession stands. The stadium management may want to lock-down the tuning of these wall-mounted TVs, the interface may be password controlled.

After download, this in-stadium application may function in a one-way fashion. It may enable a multitude of portable handheld devices 312 to see a different view of the sporting event or concert while in the stadium. Replays also are more easily facilitated to the mobile devices. The in-stadium video may not be generally available outside of the stadium or may not be the same as what is delivered to network feeds. For example, critical camera angles may be provided to portable devices 312 that officials used to review play calls by officials and referees.

Figure 5:
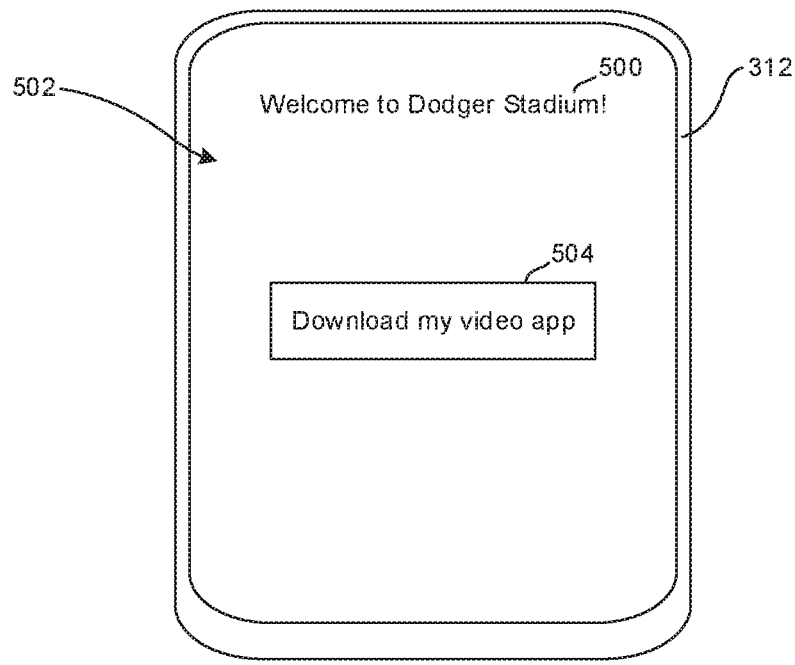
FIGS. 5-8 illustrate example screen shots of a user device in the stadium receiving tailored video feeds using an application ("app")

Now referring to FIG. 5, a welcome message 500 may be presented on a display 502 of a user device 312, e.g., as received from the transmitter 404 in FIG. 4 when the user device 312 is detected using Bluetooth or Wi-Fi connectivity or other means entering the stadium. A prompt 504 may be presented which when selected by the user causes the user device to send a signal requesting an in-stadium application ("app") discussed herein. The user device 312 may pre-load the app prior to the user going to the stadium if desired from, e.g., any of the servers described herein.

Figure 6:
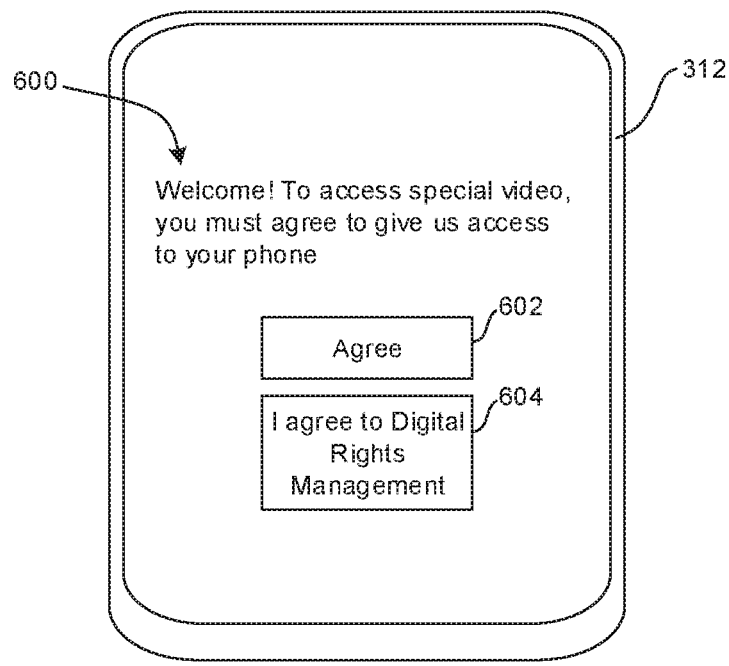

Assuming the user agrees to download the app or automatically if the app is downloaded automatically, FIG. 6 illustrates a permission UI 600 that may be presented on the user device 312 which includes a prompt 602 for the user to agree to allow the app to access data and components in the user device 312, such as user profile information, device information, and device security components including a system on a chip (SOC) security chip. A selector 602 may be presented and may be selectable to agree to allow the app access. Also, a digital rights management (DRM) selector 604 may be presented and may be selectable to agree to conform to relevant DRM requirements and limitations for re-transmitting video received through the app.

Figure 7:
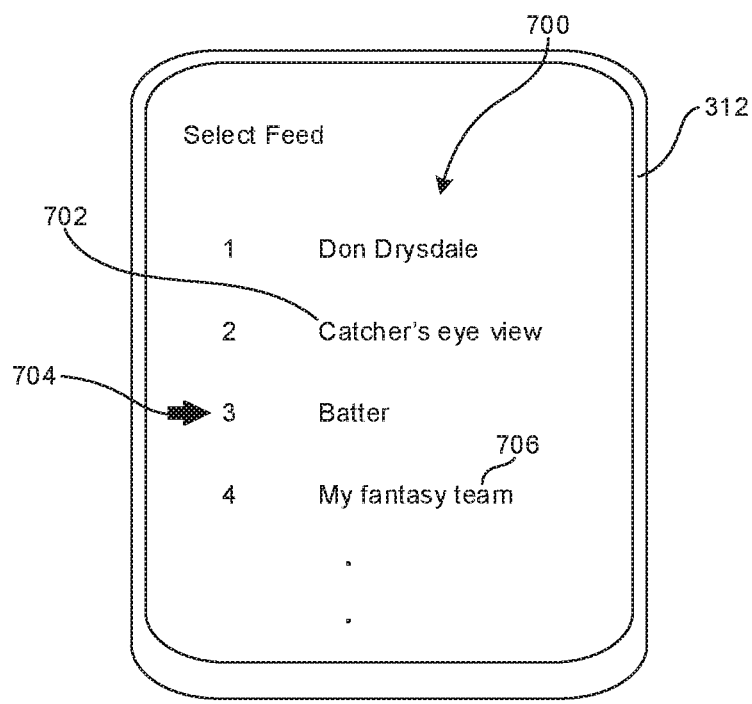
Figure 8:
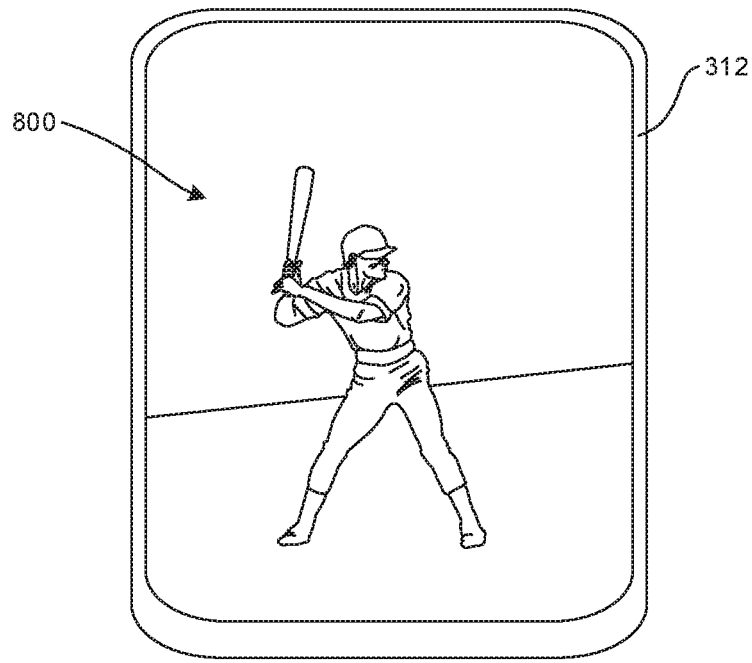

FIG. 7 illustrates a list 700 of video feeds available in the stadium and environs (including the parking lot but not extending beyond the stadium environs) from which a particular feed 702 may be selected. In the example shown, as indicated at 704 the user has selected to view a batter feed in a baseball game, and so as shown in FIG. 8 a video 800 of the batter is shown on the user device 312. In this way, the user can view the real-world field of action and also focus on a specific tailored video feed that is of interest to the user and that is presented on the user device 312.

FIG. 7 also indicates that the user can select at 706 to view video feeds of one or more players on the user's fantasy sports team as described further below.

Figure 9:
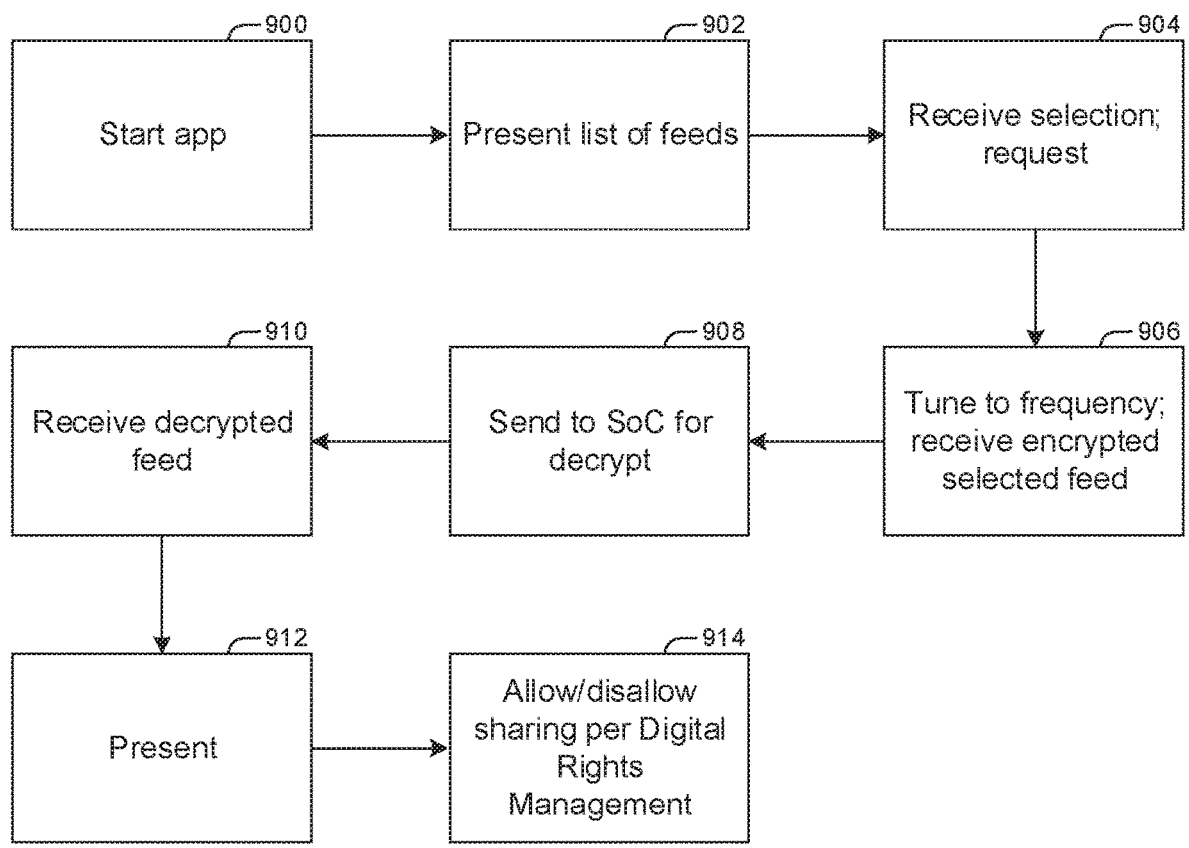
FIG. 9 illustrates example logic using example flow chart format.

FIG. 9 illustrates further principles. Commencing at block 900 a user device starts up the app discussed herein. Moving to block 902 the list 700 of feeds in FIG. 7 is presented and a user selection received at block 904 of a feed from the list.

Note that the app may be configured to recognize which frequencies and associated video feeds are associated with the stadium. The stadium may be identified using location information in the user device from, e.g., GPS. In this way, the user device executing the app can be presented with a first list in a first stadium and a second list in a second stadium.

Moving to block 906, the app, which internally correlates stadium feeds on the list 700 with respective digital TV frequencies on which the feeds are broadcast by, e.g., the transmitter 404 in FIG. 4, causes the user device to tune to the frequency associated with the feed selected at block 904. The selected feed is received and may be encoded as described herein. If encoded the user device may receive, along with the selected feed, necessary decryption information such as decryption keys.

At block 908 the video signal may be sent to the secure chip 38 shown in FIG. 1 for decryption, bypassing the main processor of the user device. Any decryption information received with the video feed also is sent to the secure chip. The decrypted feed is received from the secure chip at block 910 and presented on the user device at block 912.

Block 914 indicates that sharing of the selected feed by, e.g., transmitting the feed from the user device elsewhere is allowed or disallowed as DRM rights dictate.

Figure 10:
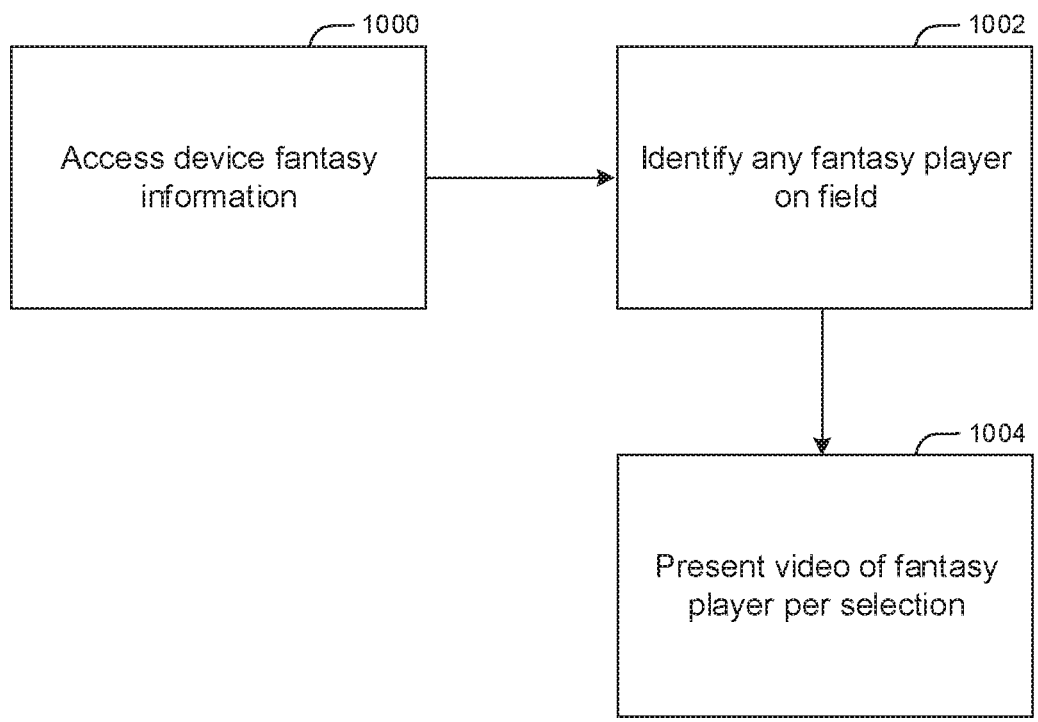
FIG. 10 illustrates further example logic using example flow chart format.

FIG. 10 indicates that at block 1000, the app may access the user's fantasy sports team information stored in the user device 312. Moving to block 1002, the app may access rosters or playbills or other information about competitors or performers in the stadium/arena to determine if any player on the fantasy sports team of the user is a member of a team competing or performing in the stadium. Upon identifying that a person on a particular user's fantasy team is playing, the app sorts through the available video feeds and if a feed is focused on that fantasy sports team member, an indication thereof may be presented on the list 700 shown at 706 in FIG. 7.

Present principles apply not just to fantasy sports teams but also to lists of favorite singers, actors, and other performers of the user as stored in his user device.

It will be appreciated that whilst present principals have been described with reference to some example embodiments, these are not intended to be limiting, and that various alternative arrangements may be used to implement the subject matter claimed herein.

What is claimed is:

1. A system comprising:
   at least one advanced television systems committee (ATSC) 3.0 pico or fempto transmitter disposed in a stadium or parking area thereof;
   at least one server associated with the stadium; and
   at least one user device in the stadium and configured with instructions to:
   download from the server at least one application ("app");
   execute the app to select at least a first video broadcast from the ATSC 3.0 transmitter showing at least a portion of the stadium, the first video broadcast not being broadcast by the ATSC 3.0 transmitter to receivers outside the stadium and parking areas thereof, wherein the app is configured to detect, using a global position satellite (GPS) receiver or other location sensor, a location of the stadium and correlate the location of the stadium to a frequency of the first video broadcast.

2. The system of claim 1, wherein video of action in the stadium is broadcast using ATSC 3.0 to a market region and the first video broadcast is not broadcast to the market region beyond the stadium and parking areas thereof.

3. The system of claim 1, wherein the app is executable by the user device to provide signals from the ATSC 3.0 transmitter to a secure chip in the user device bypassing a processor in the user device.

4. The system of claim 3, wherein the secure chip is configured with instructions to implement digital rights management (DRM) of the first video broadcast.

5. The system of claim 4, wherein the DRM precludes re-transmission of the first video from the user device.

6. The system of claim 1, wherein the app is executable by the user device to present on the user device at least one user interface (UI) comprising:
   at least a list of plural video feeds pertaining to activity in the stadium, wherein the first video broadcast is on the list for selection thereof.

7. The system of claim 6, wherein the app is configured to correlate the video feeds to frequencies such that the user device is caused to tune to a frequency responsive to selection of a corresponding video feed from the list.

8. The system of claim 1, wherein the app is configured to recognize which frequencies and associated video feeds are associated with the stadium, such that the user device executing the app is presented with a first list in a first stadium and a second list in a second stadium.

9. The system of claim 1, wherein the user device is configured with instructions to:
   download along with the app encryption information necessary to present the first video feed on the user device.

10. The system of claim 1, wherein the user device is implemented by a hand-holdable user device.

11. The system of claim 1, wherein the user device is implemented by a TV mounted in the stadium.

12. The system of claim 11, comprising a hand-holdable user device, the hand-holdable user device when executing the app being configured to present a first list of video feeds and the TV when executing the app being configured to present a second list of video feeds different from the first list.

13. An apparatus comprising:
   at least one computer medium that is not a transitory signal and comprises instructions executable by at least one processor to:
   configure a tuner to receive a broadcast digital TV signal in a stadium or concert hall venue;
   identify, using a software application ("app"), a performer in the stadium or concert venue hall at least in part by accessing information stored in the apparatus;
   based at least in part on identifying the performer, tune to a frequency of an audio-video stream;
   use a demodulator to process the broadcast digital TV signals to recover the audio; and
   present the audio-video stream.

14. The apparatus of claim 13, wherein the instructions are executable to:
   download the software application ("app");
   using the app, configure the tuner and demodulator;
   receive over-the-air broadcast content from a source of content in a stadium or concert hall; and
   play the content.

15. The apparatus of claim 13, wherein the digital TV signal comprises an advanced television systems committee (ATSC) 3.0 TV signal.

16. The apparatus of claim 14, wherein the app is executable by the media playback apparatus to provide digital TV signals to a secure chip in the media playback apparatus bypassing a processor in the media playback apparatus.

17. The apparatus of claim 14, wherein the app is executable by the media playback apparatus to present on the media playback apparatus at least one user interface (UI) comprising:
   at least a list of plural video feeds pertaining to activity in the stadium or concert hall venue.

18. The apparatus of claim 17, wherein the app is configured to correlate the video feeds to frequencies such that the media playback apparatus is caused to tune to a frequency responsive to selection of a corresponding video feed from the list.

19. The apparatus of claim 14, wherein the app is configured to recognize which frequencies and associated video feeds are associated with the stadium or concert hall venue, such that the media playback apparatus executing the app is presented with a first list in a first stadium or concert hall venue and a second list in a second stadium or concert hall venue.

\* \* \* \* \*